June 11, 1957 W. M. ROSE 2,795,204
AIR PRESSURE INDICATOR
Filed Oct. 1, 1954

INVENTOR.
Wilbert M. Rose
BY
Paul B. Fihe
PATENT AGENT

2,795,204

AIR PRESSURE INDICATOR

Wilbert M. Rose, San Jose, Calif.

Application October 1, 1954, Serial No. 459,647

5 Claims. (Cl. 116—34)

The present invention relates to pressure gauges or indicators, and more particularly to air pressure indicators adapted for utilization with pneumatic tires.

Various gauges have been proposed for application to the valve stem conventionally found on pneumatic tires. These gauges provide an indication of tire pressure, and particularly indicate when the pressure within a tire has dropped below a predetermined level. Most of these gauges have employed a diaphragm which is exposed to the pressurized air and the position of the diaphragm consequently varies with a change in the tire pressure. While these gauges have been operative devices, they have not been too evident on the retail market for the apparent reason that they were not commercially feasible. More particularly, each was expensive, being constructed of a large number of parts which were difficult to assemble. In addition to the high cost, the gauges had a relatively short life because the diaphragms were constantly in a stretched or strained position so that their failure or rupture occurred rapidly in use.

Accordingly it is an object of the present invention to provide a pressure indicator that is not only inexpensive and simple to construct but which has a relatively long operating life.

A feature of the invention involves the provision of a pressure indicator having a diaphragm arranged for movement between positions of rest whereat the diaphragm is in equilibrium or is, in other words, not stretched or otherwise strained so that its useful operating life is prolonged.

Another feature involves the construction and assembly of the indicator in that the mechanical design entails the utilization of but few parts which are readily brought into and secured in assembled relationship.

Figure 1:
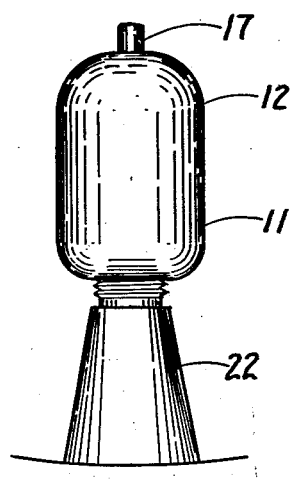
Figure 2:
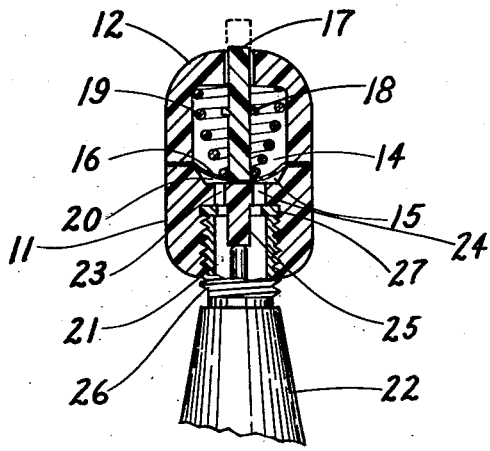
Figure 3:
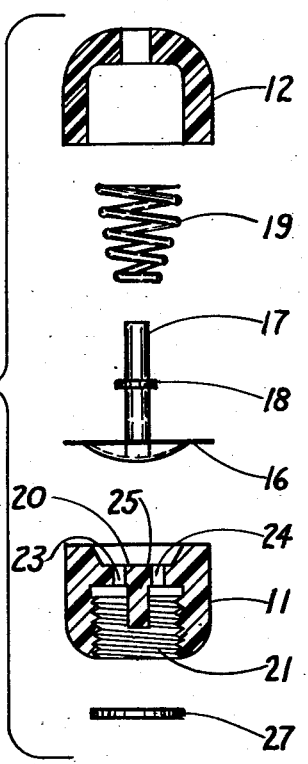
Figure 4:
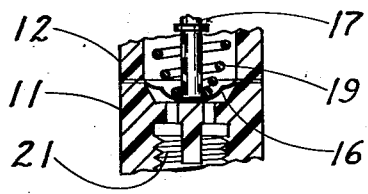
Figure 5:
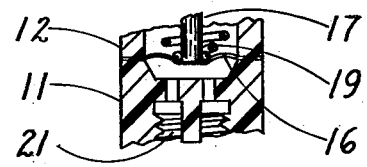
Figure 6:
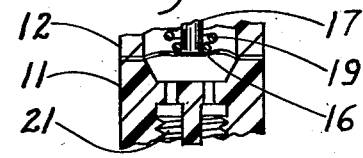

These and other features and the advantages stemming from the invention will be made apparent from a perusal of the following description of the accompanying drawing wherein:

Figure 1 is a side elevational view of an indicator constituting a preferred embodiment of the present invention as applied to the valve stem of a pneumatic tire, Figure 2 is a fragmentary sectional view taken substantially centrally through the indicator as shown in Figure 1, Figure 3 is an exploded view of the parts which make up the preferred embodiment of the invention as shown in Figure 1 and Figure 2, certain of these parts being shown in section to illustrate details thereof, Figure 4 is a fragmentary central sectional view of a modified embodiment of the invention, and Figure 5 and Figure 6 are views similar to Figure 4 but with the indicator in different indicating positions.

As shown in Figures 1, 2 and 3, the preferred embodiment of the invention includes a housing composed of a generally cylindrical base 11 and a cup-shaped top or cap 12 which is secured in inverted position on the base 11 so as to form a chamber therein. This chamber is divided into upper and lower compartments 14, 15 by a resilient diaphragm 16 that is hermetically sealed between the base 11 and the cap 12 adjacent its circular edge or periphery.

In accordance with the present invention, the diaphragm 16 is so secured between the cap 12 and the base 11 that its central portion assumes a dished or concavo-convex disposition in the absence of any applied forces. This natural or equilibrium position is clearly shown in Figure 2. It will be readily apparent that a second equilibrium position with the diaphragm 16 dished not downwardly, as shown in full lines, but upwardly, as indicated by phantom lines in Figure 2, also exists. As will be explained in detail hereinafter, the diaphragm 16 is arranged to assume either one or the other of these equilibrium positions depending upon the pressure differential between the two compartments 14, 15 formed on opposite sides thereof. It will not assume any intermediate non-equilibrium position except instantaneously as it moves from the first to the second equilibrium position or vice versa. As a consequence, the stretch on the diaphragm 16 which would occur were it to remain in an intermediate non-equilibrium position is eliminated and the useful life or longevity of the diaphragm 16 is consequently extended a significant amount.

An indicating pin 17 is centrally secured to the diaphragm 16 to rise upwardly therefrom and enter a central opening 18 through the cap 12. This pin 17 is of such length that its upper end will be approximately flush with the surface of the cap 12 when the diaphragm 16 is in its lower equilibrium position, but upon movement of the diaphragm to its second or upper equilibrium position, the pin 17 will protrude from the cap, as shown in phantom lines in Figure 2 and in full lines in Figure 1. A collar 18 is formed integrally on the pin 17 at a predetermined intermediate point so as to engage the cap 12 upon upward movement of the pin 17 and attached diaphragm 16 so that the latter will be limited in its upward movement and precluded from moving beyond its upper equilibrium position.

The diaphragm 16 is biased toward its lower equilibrium position by a helical spring 19 which surrounds the described indicating pin 17 and is compressed within the upper compartment 14 between the inner surface of the cap 12 and the upper surface of the diaphragm 16. Preferably, the spring 19 is of decreasing diameter so as to engage the central portion of the diaphragm 16 immediately adjacent the pin 17; thus the spring force is most effectively applied at the center of the diaphragm. The diaphragm 16 is, in the absence of a predetermined pressure differential between the upper and lower compartments 14, 15, held in its lower equilibrium position as a result of the described action of the spring 19, but is arranged to engage a seat 20 formed in the base 11 of the indicator housing and defining one wall of the lower compartment 15 so that movement of the diaphragm 16 beyond its lower equilibrium position is also precluded.

This lower compartment 15 is arranged for communication with an axial bore 21 in the lower portion of the base 11, such bore being threaded so that the base 11 can be screwed onto a valve stem as indicated at 22. For such communication small passages 23, 24 connect the lower compartment with the bore 21, the passages being formed on opposite sides of a central, dividing partition 25 which projects into the axial bore 21 and engages and depresses the air-release pin 26 centrally disposed within the conventional valve stem 22 when the base 11 is screwed onto the latter as previously described. A suitable ring gasket 27 is inserted in the axial bore 21 in the base so that a hermetic seal will be provided when the indicator is applied to the valve stem.

When so applied, air from within the tire passes through the described passages 23, 24 and into the lower compartment 15 so as to exert pressure against the lower face or surface of the diaphragm 16 which pressure is opposed by the atmospheric pressure within the upper compartment 14 as well as the pressure of the spring 19 and the inherent resistance of the diahpragm itself to displacement from its lower equilibrium position. When these opposing forces are overcome by the air pressure within the tire, the diaphragm 16 will move from its lower equilibrium position as shown in full lines in Figure 2 directly to its upper equilibrium position as shown in phantom lines. The movement is directly from the lower to the upper position in what might be termed a snap-action of the diaphragm 16 because once the initial resistance to movement of the diaphragm from its lower equilibrium position is overcome, the air pressure in the lower compartment is sufficient to complete movement of the diaphragm 16 to its upper equilibrium position with no intervening positions of rest. Reduction of air pressure within a tire when the diaphragm 16 has been in its upper equilibrium position will result in a reversal of the described snap-action so that the diaphragm will move, upon predetermined pressure reduction, directly from its upper to its lower equilibrium position.

As will be apparent, the spring 19 constitutes the arbitrary variable in balancing the air pressure within a tire. If, for example, a tire or more particularly, a tube within a tire is supposed to be inflated to a pressure of 30 p. s. i. and it is desired that an indication be given when the pressure drops below 27 p. s. i. so that the tube can be reinflated, the spring 19 is chosen so that application of the indicator to a tire (tube) containing 30 p. s. i. will result in upward movement of the diaphragm 16 and consequent protrusion of the indicating pin 17 so that the indicator will appear as shown in Figure 1. When the tire pressure drops below 27 p. s. i., the diaphragm 16 will snap to its lower position and the attached indicating pin 17 will be withdrawn from view to give immediate visual indication that reinflation is required. To facilitate the visual indication, the upper end of the pin 17 can be coated with red or other bright coloring.

Since the diaphragm 16 rests in either its upper or lower equilibrium position a preponderance of the time, and only upon the occasion of predetermined pressure change moves from one position to the other, it is rendered substantially free from strain, wherefore, as previously mentioned, its useful life is greatly prolonged.

Furthermore, although it will be apparent from the foregoing description that the indicator embodying the present invention is constructed of but a few parts and is accordingly simple and inexpensive to construct regardless of the materials employed, it is preferred that the base 11, cap 12, diaphragm 16 and indicating pin 17 be composed of a plastic such as "teflon" to facilitate assembly and further reduce the cost. Such plastic parts are readily secured to one another by the simple application of heat. Thus, for example, the diaphragm 16 can be secured first to the indicating pin 17, as best shown in Figure 3, by the application of heat, and thereafter, upon assembly of the parts, a second application of heat will secure the cap and base portions 11, 12 of the housing in hermetically-sealed relation to the interposed diaphragm 16.

The embodiment of the invention shown in Figures 1, 2 and 3 shows an indicator having two indicating positions so that only pressure above or below a predetermined amount is indicated. Normally a tire is inflated to the proper pressure and indication of under-inflation or a drop from the proper pressure is all that is desired. However, if, in addition, it is desired to indicate over-inflation, a modified embodiment of the invention can be utilized.

Such modified embodiment is shown in Figures 4, 5, and 6 which illustrate three positions, under-inflation, proper inflation and over-inflation of a tire, respectively.

To enable such three-position indication, the diaphragm of the embodiment shown in Figures 1, 2 and 3 is alone modified, the other parts remaining the same. The modified version of the diaphragm, generally indicated at 16', consists in the thickening of the central portion thereof, so that, in effect, a double concavo-convex configuration results. In the absence of tire pressure the modified diaphragm 16' will assume the position shown in Figure 4 with a slight downward dishing of the annular thin portion of the diaphragm 16' and an additional downward dishing of the central, thickened portion thereof. As the tire pressure is raised to the proper inflation level, the resistance of the annular portion of the diaphragm 16' is overcome so that the same snaps into an upwardly dished position, the thickened central portion remaining in its downwardly dished position, as illustrated in Figure 5. If by some chance the tire is over-inflated, the higher resistance of the central portion of the diaphragm 16' is also overcome so that it, too, snaps upwardly, the resultant disposition being shown in Figure 6.

In this second embodiment, the features of the first are also apparent; the diaphragm 16' always rests in one of its (three) equilibrium positions so that its useful life is relatively great, and the parts which compose the indicator are both few and readily assembled.

Other modifications and alterations can obviously be made without departing from the spirit of the invention. Accordingly the foregoing description of two specific embodiments are to be considered as purely exemplary and not in a limiting sense, the actual scope of the invention being indicated by the appended claims.

I claim:

1. A pressure indicator comprising a housing having a chamber formed therein, a diaphragm rigidly supported adjacent its periphery by said housing so that its central portion within the chamber forms one wall of a compartment adapted to communicate with the source of pressure and is movable between two like equilibrium positions at each of which said diaphragm assumes a concavo-convex shape, and means constantly urging said diaphragm toward one of its equilibrium positions, said diaphragm having an inherent resistance to movement from either of its equilibrium positions whereby force sufficient to overcome such resistance and said diaphragm-urging means will effect substantially instantaneous movement of said diaphragm from said one equilibrium position to the other of said equilibrium positions.

2. A pressure indicator comprising a housing having a chamber formed therein, a diaphragm rigidly supported adjacent its periphery by said housing so that its central portion within the chamber forms one wall of a compartment adapted to communicate with the source of pressure and is movable between two equilibrium positions, means constantly urging said diaphragm in one direction toward one of its equilibrium positions, and means arranged to engage said diaphragm to preclude further movement thereof in said one direction beyond its equilibrium position when said diaphragm is moved by said diaphragm-urging means.

3. A pressure indicator according to claim 2 comprising means for precluding movement of said diaphragm in the other direction beyond its other equilibrium position.

4. A pressure indicator comprising a housing having a chamber formed therein with openings at each end thereof, a diaphragm rigidly supported adjacent its periphery by said housing so that its central portion within the chamber forms one wall of a compartment adapted to communicate through one of said openings with the source of pressure, said diaphragm being movable between two equilibrium positions and having inherent resistance to movement from either of its equilibrium positions whereby force sufficient to overcome such resistance will effect substantially instantaneous movement of said diaphragm from one of its equilibrium positions to the other, and an indicating pin attached to said diaphragm and arranged to protrude through the other of said openings in said housing when said diaphragm is in one of its equilibrium positions.

5. A pressure indicator according to claim 4 comprising a stop secured to said indicating pin to limit its protrusion from said housing and simultaneously to limit movement of said diaphragm beyond its one equilibrium position.

References Cited in the file of this patent

UNITED STATES PATENTS

| | | |
|---|---|---|
| 1,289,712 | Evans | Dec. 31, 1918 |
| 1,610,452 | Kennedy | Dec. 14, 1926 |
| 1,618,211 | McNatt | Feb. 22, 1927 |
| 2,651,279 | Laurie | Sept. 8, 1953 |
| 2,704,045 | Riesing | Mar. 15, 1955 |